United States Patent
Heggen

[15] 3,705,600
[45] Dec. 12, 1972

[54] COMBINATION RELIEF AND CHECK VALVE

[72] Inventor: John Peter Heggen, Lisbon, N. Dak.
[73] Assignee: Clark Equipment Company
[22] Filed: Nov. 23, 1970
[21] Appl. No.: 91,737

[52] U.S. Cl. .............................................. 137/493.2
[51] Int. Cl. .......................... F16k 17/26, F16k 45/00
[58] Field of Search..137/493.2, 493.3, 493.4, 493.8, 137/493.9, 493.1, 493, 493.6

[56] References Cited

UNITED STATES PATENTS

| | | | |
|---|---|---|---|
| 1,176,117 | 3/1916 | Wheeler | 137/493.6 |
| 2,558,527 | 3/1952 | Holmes | 137/493.6 X |
| 1,901,982 | 3/1933 | Pardue | 137/541 X |
| 2,345,547 | 3/1944 | Roth et al. | 137/493.6 X |
| 2,530,285 | 11/1950 | Catranis | 137/493.6 X |
| 2,526,197 | 10/1950 | Cannon et al. | 137/493 X |
| 2,726,737 | 12/1955 | Chisholm, Jr. | 137/493.6 X |
| 3,108,610 | 10/1963 | DeSee | 137/493 |

Primary Examiner—Henry T. Klinksiek
Assistant Examiner—Robert J. Miller
Attorney—Kenneth C. Witt, John C. Wiessler, Robert H. Johnson and Lewis J. Lamm

[57] ABSTRACT

A valve having a valve body with a bore disposed therethrough providing a valve chamber in communication with an inlet passage and an outlet passage. A valve element having a valve head and attached valve stem is axially reciprocable within the bore and is spring biased toward a closed position to restrict the flow of fluid through the valve in one direction until a selected positive pressure differential is exerted across the valve. The valve head has at least one opening therethrough and a valve plate is movable along the stem between a position adjacent the head and covering the opening therein and a position apart from the head to thereby permit the flow of fluid through the opening when a negative pressure differential is exerted across the valve.

4 Claims, 4 Drawing Figures

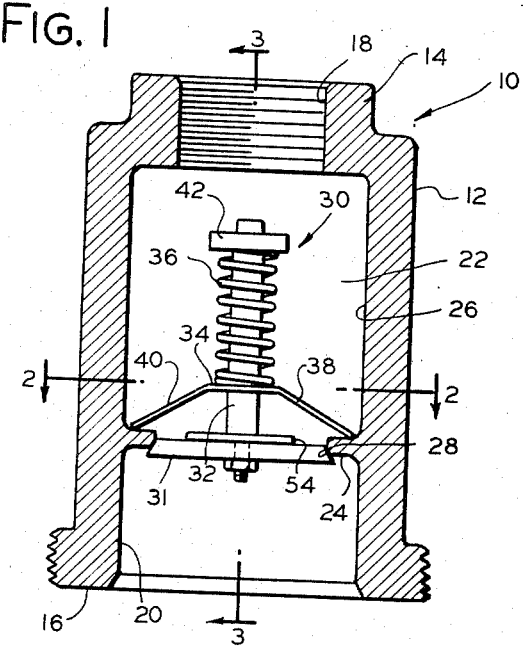
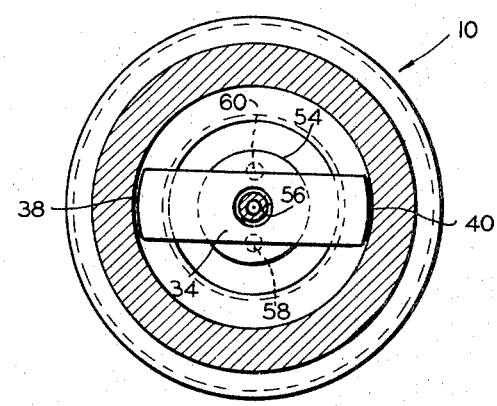
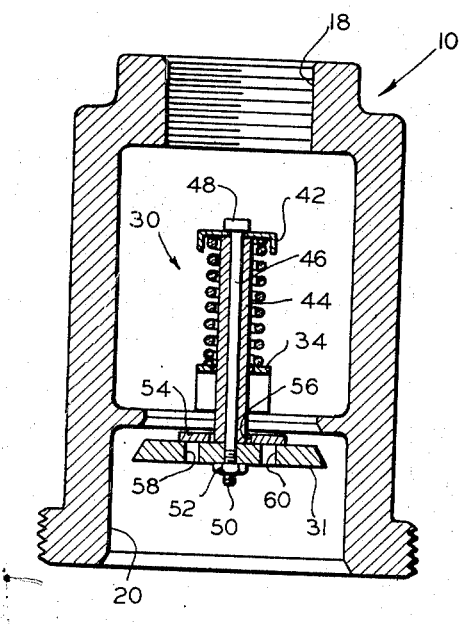
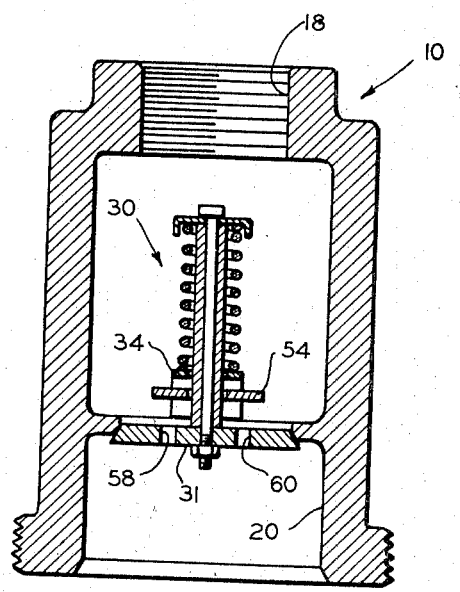
INVENTOR
JOHN P. HEGGEN
BY
ATTORNEY

COMBINATION RELIEF AND CHECK VALVE

BACKGROUND OF THE INVENTION

The field of art to which this invention relates includes fluid valves, and more specifically, fluid relief valves that permit the flow of fluid therethrough in either direction dependent upon selected pressure differentials across the valve. A fluid system in which a relief valve according to this invention may be used is disclosed in application Ser. No. 5,756, filed Jan. 26, 1970, entitled "Fluid System for a Vehicle with Fluid Drive Means," and assigned to the same assignee as the present invention now U.S. Pat. No. 3,646,596.

In fluid systems it is often desirable to provide a relief valve at selected stations within the system to allow for the diversion of a portion of the fluid when the pressure differential across the valve exceeds a selected value. Such relief valves commonly provide an inlet passage for communication with a high pressure portion of the system and an outlet passage for communication with a low pressure portion of the system and are adapted to permit the flow of fluid therethrough in one direction only; that is, from the high pressure portion through the valve into the low pressure portion. If it is desired to permit the flow of fluid in the opposite direction in the event that the pressure in the low pressure portion of the system exceeds the pressure in the high pressure portion, it has been the common practice to provide a separate "by-pass" conduit between the high and low pressure portions of the system with a one-way check valve disposed therein. Such use of a separate by-pass conduit and check valve, while effectively accomplishing its purpose, complicates the fluid system and adds to its cost.

It is, therefore, a principal object of my invention to provide a single relief valve that is adapted to allow the flow of fluid therethrough in one direction when a selected "positive" pressure differential is exerted across the valve and to allow the flow of fluid in the opposite direction therethrough when a "negative" pressure differential is exerted across the valve.

SUMMARY OF THE INVENTION

In carrying out my invention in a preferred embodiment thereof, I provide a relief valve having a valve body with a bore extending therethrough in communication with an inlet passage and an outlet passage. Disposed within the bore for reciprocal movement along the axis thereof is a valve element including a valve stem and a valve head having at least one opening therethrough. A valve plate is carried by the stem with the plate movable along the stem between a sealing position adjacent the head and covering the opening therein and an open position apart from the head. Means are provided for urging the valve element into sealing engagement with a valve seat disposed within the bore.

The above and other objects, features and advantages of my invention will be more readily understood by persons skilled in the art when the following detailed description is taken in conjunction with the drawing.

BRIEF DESCRIPTION OF THE DRAWING

FIG. 1 is a longitudinal view partially in section of a valve embodying my invention and illustrating the position of the valve components when the flow of fluid through the valve is restricted in both directions, FIG. 2 is a cross sectional view of the valve shown in FIG. 1 as viewed along the section line 2—2 of FIG. 1.

FIG. 3 is a side sectional view of the valve shown in FIG. 1 as viewed along the section line 3—3 of FIG. 1 and illustrating a positioning of the valve components allowing fluid to flow downward through the valve, and FIG. 4 is a side sectional view similar to FIG. 3 and illustrating a positioning of the valve components allowing fluid to flow upward through the valve.

DESCRIPTION OF PREFERRED EMBODIMENT

Referring to FIG. 1, a valve embodying this invention is designated generally by the numeral 10 and includes a hollow valve body or casing 12 having suitable fittings at both ends thereof for inclusion of the valve in the flow path of a fluid system, as for example by the threaded end shown at 14 or by the flared end shown at 16. Disposed through valve body 12, and in communication with the inlet passage 18 and the outlet passage 20, is a valve chamber or bore 22 having a circular lip 24 extending radially inward from the wall 26 of the bore, around the entire periphery thereof. A tapered valve seat 28 is formed on the inner edge of lip 24 for sealing engagement with a valve element 30 as hereinafter explained.

Valve element 30 includes a valve head 31 in the form of a flat circular disc having a frusto-conical periphery of a diameter and angle selected to sealingly engage valve seat 28 when the valve is in the closed position illustrated in FIG. 1. Valve element 30 also includes an axially reciprocable valve stem 32 attached concentrically at one end thereof to head 31 and slidably disposed through an opening central to the hub portion of a two legged guide spider 34 providing means for maintaining the valve element in alignment with the axis of bore 22 as the valve opens and closes. Spider 34 is constantly urged into engagement with the upper surface of lip 24 by the force of a helical compression spring 36 surrounding stem 32 and is held in a radially central position by virtue of the outer ends of both spider legs 38 and 40 abutting wall 26 of bore 22, on opposite sides thereof. Stem 32 carries an outwardly extending flanged portion or spring retainer 42 near its end opposite head 31 which is adapted to receive the forces of spring 36 to provide means for biasing the valve element toward the closed position and is also adapted to sustain the spring in a compressive state between retainer 42 and spider 34. The details of the construction of stem 32 are best understood with specific reference to FIG. 3 wherein the stem is seen to include a cylindrical spacer 44 of a selected length, and a tension bolt 46 having an enlarged portion or head 48 at one end thereof and a threaded portion 50 at the other end thereof adapted to be threadably engaged by a mating nut 52. Bolt 46 is disposed through bores central to spring retainer 42, spacer 44, and head 31 with the spacer positioned intermediate retainer 42 and head 31 so that these components are compressively held in axial alignment a selected distance apart upon bolt 46 when nut 52 is properly threaded onto the bolt.

Referring specifically to FIG. 2, the outwardly extending legs 38 and 40 of spider 34 are of only sufficient width to rigidly maintain the hub portion of the spider in a radially central position, thereby permitting the flow of fluids in either direction around spider 34 and through the valve with minimum blockage. Referring to FIG. 2 in conjunction with FIG. 3, a valve means in the form of a circular plate 54 having a central bore 56 therein that is adapted to slidably receive stem 32 therethrough is loosely carried by the stem to "float" along the valve stem between a sealing position adjacent head 31 as illustrated in FIG. 1, and an open position apart from head 31 and adjacent the legs of spider 34, as illustrated in FIG. 4. Fluid passage means is provided through valve element 30 by a pair of openings 58 and 60 disposed through head 31 on opposite sides thereof which are located a selected distance from the center of the head less than the radius of plate 54, so that in the sealed position illustrated in FIGS. 1 and 3 plate 54 covers both openings 58 and 60 to block the flow of fluid therethrough.

In operation, both valve element 30 and plate 54 will remain in the closed and sealed positions illustrated in FIG. 1 until the fluid pressure in inlet passage 18 exceeds the fluid pressure in outlet passage 20 by a preselected differential as determined by the force exerted by spring 36, whereupon valve element 30 will be urged to move downward to the open position illustrated in FIG. 3 and fluid will be permitted to flow through the valve in the direction of outlet passage 20. During the flow of fluid through valve 10 in the direction of outlet passage 20, plate 54 remains in the sealing position adjacent valve head 31 since the pressure forces acting upon its exposed upper surface exceed the pressure forces acting upon its lower surface. When the pressure differential between the inlet pressure and the outlet pressure again reduces to below the selected differential, valve element 30 will be urged by spring 36 to return to the closed position illustrated in FIG. 1 and the flow of fluid will again be restricted. If the fluid pressure in outlet passage 20 exceeds the fluid pressure in inlet passage 18, plate 54 will be urged to move upward away from head 31 to the open position illustrated in FIG. 4 so that fluid will be permitted to flow into outlet passage 20, through openings 58 and 60, and out through inlet passage 18. When the pressure in inlet passage 18 again exceeds the pressure in outlet passage 20 fluid will momentarily flow through openings 58 and 60 in the direction of outlet passage 20 and plate 54 will be drawn to the sealed position adjacent head 31 to again cover the openings and restrict the flow of fluid.

While only a single embodiment of my invention has been described in detail, it will be understood that such detailed description is intended to be illustrative only and that various modifications and changes may be made to my invention without departing from the spirit and scope of it. Therefore, the limits of my invention should be determined from the attached claims.

I claim:

1. A valve comprising,
   a valve body, said body having a bore extending therethrough,
   a valve seat located in said bore,
   a valve element disposed in said bore and movable between a closed position in sealing relationship with said seat and an open position which permits flow past said seat in one direction through said bore,
   said valve element comprising a head and a stem connected to the head,
   a spring retainer fixed in relationship to said stem,
   a spring disposed between said stem and spring retainer biasing said valve element toward a closed position,
   fluid passage means extending through said valve element, and
   valve means carried by said valve element and freely movable between a sealing position blocking the flow through said fluid passage means and an open position permitting flow through said fluid passage means depending solely upon the pressure differential across said valve element.

2. A valve according to claim 1 wherein said valve means is axially movable on said stem between said spring retainer in the open position and said valve element head in the sealing position.

3. A valve according to claim 2 wherein said valve means is a plate member and said fluid passage means are a plurality of apertures in said valve element head, said plate member being disposed to overlie and cover such apertures in the sealing position.

4. A valve according to claim 3 wherein said plate is a circular annulas having a center bore slidably received loosely on said stem so as to float therealong between a sealing position adjacent said head and an open position spaced therefrom according to the pressure differential on opposite sides of said valve element.

* * * * *